(12) United States Patent
Susca et al.

(10) Patent No.: US 12,024,306 B2
(45) Date of Patent: Jul. 2, 2024

(54) ACTUATOR SYSTEMS WITH SHARED REDUNDANCY

(71) Applicant: Hamilton Sundstrand Corporation, Charlotte, NC (US)

(72) Inventors: Ryan Susca, Windsor, CT (US); Francis P. Marocchini, Somers, CT (US); Peter M. Ballard, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 233 days.

(21) Appl. No.: 17/581,525

(22) Filed: Jan. 21, 2022

(65) Prior Publication Data

US 2023/0294835 A1 Sep. 21, 2023

(51) Int. Cl.
*B64D 31/02* (2006.01)
*F15B 20/00* (2006.01)
*G05D 16/20* (2006.01)

(52) U.S. Cl.
CPC ............ *B64D 31/02* (2013.01); *F15B 20/008* (2013.01); *G05D 16/2022* (2019.01); *G05D 16/204* (2013.01)

(58) Field of Classification Search
CPC ................. F15B 11/16; F15B 20/008; F15B 2211/8757; B64C 13/36; B64C 13/504
See application file for complete search history.

(56) References Cited

U.S. PATENT DOCUMENTS 3,791,775 A * 2/1974 Bochnak ............... F15B 11/17
60/405
4,138,088 A 2/1979 Cyrot
(Continued)

FOREIGN PATENT DOCUMENTS

WO WO-2017001984 A1 1/2017

OTHER PUBLICATIONS

Extended European Search Report for European Patent Application No. EP23152952.0, dated Jun. 1, 2023.

*Primary Examiner* — Thomas E Lazo
(74) *Attorney, Agent, or Firm* — Kinney & Lange, P. A.

(57) ABSTRACT

An actuator system can include a first actuator, a second actuator, a first actuator control device configured to control the first actuator, a second actuator control device configured to control the second actuator, a shared redundant actuator control device, and at least one transfer device operatively connected to the first, second, and shared redundant actuator control devices. The at least one transfer device can be configured to be operated to select between a first control mode where the first actuator control device is operatively connected to the first actuator to control the first actuator and the second actuator control device is operatively connected to the second actuator to control the second actuator, a second control mode where the shared redundant actuator control device is operatively connected to the first actuator to control the first actuator and the second actuator control device is operatively connected to the second actuator to control the second actuator, and a third control mode where the first actuator control device is operatively connected to the first actuator to control the first actuator and the shared redundant actuator control device is operatively connected to the second actuator to control the second actuator.

15 Claims, 2 Drawing Sheets

(56) References Cited

U.S. PATENT DOCUMENTS

| | | | |
|---|---|---|---|
| 6,637,199 | B2 | 10/2003 | Spickard |
| 7,003,949 | B2 | 2/2006 | Fenny et al. |
| 7,587,900 | B2 | 9/2009 | Shelby et al. |
| 8,096,321 | B2 | 1/2012 | Goll |
| 9,657,756 | B2 | 5/2017 | Bostiga et al. |
| 10,393,285 | B2 | 8/2019 | Amari et al. |
| 10,577,080 | B2 | 3/2020 | Maver |
| 2018/0002028 | A1* | 1/2018 | Polcuch ................ F15B 11/205 |
| 2019/0061916 | A1* | 2/2019 | Maver ................... B64C 11/40 |
| 2019/0344885 | A1* | 11/2019 | DeFusco ................ B64C 27/64 |
| 2021/0123458 | A1 | 4/2021 | Loos |

* cited by examiner

ACTUATOR SYSTEMS WITH SHARED REDUNDANCY

FIELD

This disclosure relates to actuator systems (e.g., for aircraft).

BACKGROUND

In many turbine engines, multi-actuator effector actuation systems (e.g., heat exchanger cooling air, turbine cooling, exhaust nozzle area) that require independent modulation of multiple elements are typically heavier than systems that do not require independent control of each actuator. Traditionally, each actuator on an aircraft has two redundant control mechanism pairs because a redundant backup control is required.

Such conventional methods and systems have generally been considered satisfactory for their intended purpose. However, there is still a need in the art for improved actuator systems. The present disclosure provides a solution for this need.

SUMMARY

An actuator system can include a first actuator, a second actuator, a first actuator control device configured to control the first actuator, a second actuator control device configured to control the second actuator, a shared redundant actuator control device, and at least one transfer device operatively connected to the first, second, and shared redundant actuator control devices. The at least one transfer device can be configured to be operated to select between a first control mode where the first actuator control device is operatively connected to the first actuator to control the first actuator and the second actuator control device is operatively connected to the second actuator to control the second actuator, a second control mode where the shared redundant actuator control device is operatively connected to the first actuator to control the first actuator and the second actuator control device is operatively connected to the second actuator to control the second actuator, and a third control mode where the first actuator control device is operatively connected to the first actuator to control the first actuator and the shared redundant actuator control device is operatively connected to the second actuator to control the second actuator.

The first actuator and the second actuator can be hydraulic actuators. The first actuator control device, the second actuator control device, and the shared redundant actuator control device can be electrohydraulic servo valves (EHSVs) configured to control a position of the first actuator and/or second actuator as a function of a respective actuator valve control pressures and electrical inputs when connected to a respective actuator.

In certain embodiments, each actuator control device is operatively connected to a supply pressure line having a supply pressure and a return pressure line having a return pressure. Each actuator control device can be configured to output a first control pressure on a first control line and a second control pressure on a second control line to a respective actuator when connected to the respective actuator.

In certain embodiments, the at least one transfer valve can be a single transfer valve. The system can include a transfer valve control device configured to control the position of the single transfer valve. The transfer valve control device can be an EHSV configured to control a position of the transfer valve as a function of a first transfer valve control pressure on a first transfer control line and a second transfer valve control pressure on a second transfer control line.

In certain embodiments, the at least one transfer valve includes a first transfer valve configured to select between the first actuator control device and the shared redundant actuator control device to be connected to the first actuator, and a second transfer valve configured to select between the second actuator control device and the shared redundant actuator control device to be connected to the second actuator. The system can include a first transfer valve control device configured to control the position of the first transfer valve, and a second transfer valve control device configured to control the position of the second transfer valve.

The first transfer valve control device can include a first solenoid valve connected to the first transfer valve to supply a first transfer control pressure to the first transfer valve on a first side thereof. The second transfer valve control device can include a second solenoid valve connected to the second transfer valve to supply a second transfer control pressure to the second transfer valve on a first side thereof. In certain embodiments, the first transfer valve and the second transfer valve can be connected to a common return pressure line on a respective second side thereof.

In accordance with at least one aspect of this disclosure, an aircraft actuator system can include two actuators, three control valves configured to provide primary control and redundant control for the two actuators. The aircraft actuator system can be any suitable actuator system disclosed herein, e.g., as described above.

In accordance with at least one aspect of this disclosure, a method can include using a single shared redundant actuator control device to provide backup redundant control to two actuators on an aircraft. The method can include switching which actuator is connected to the single shared redundant actuator control device. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
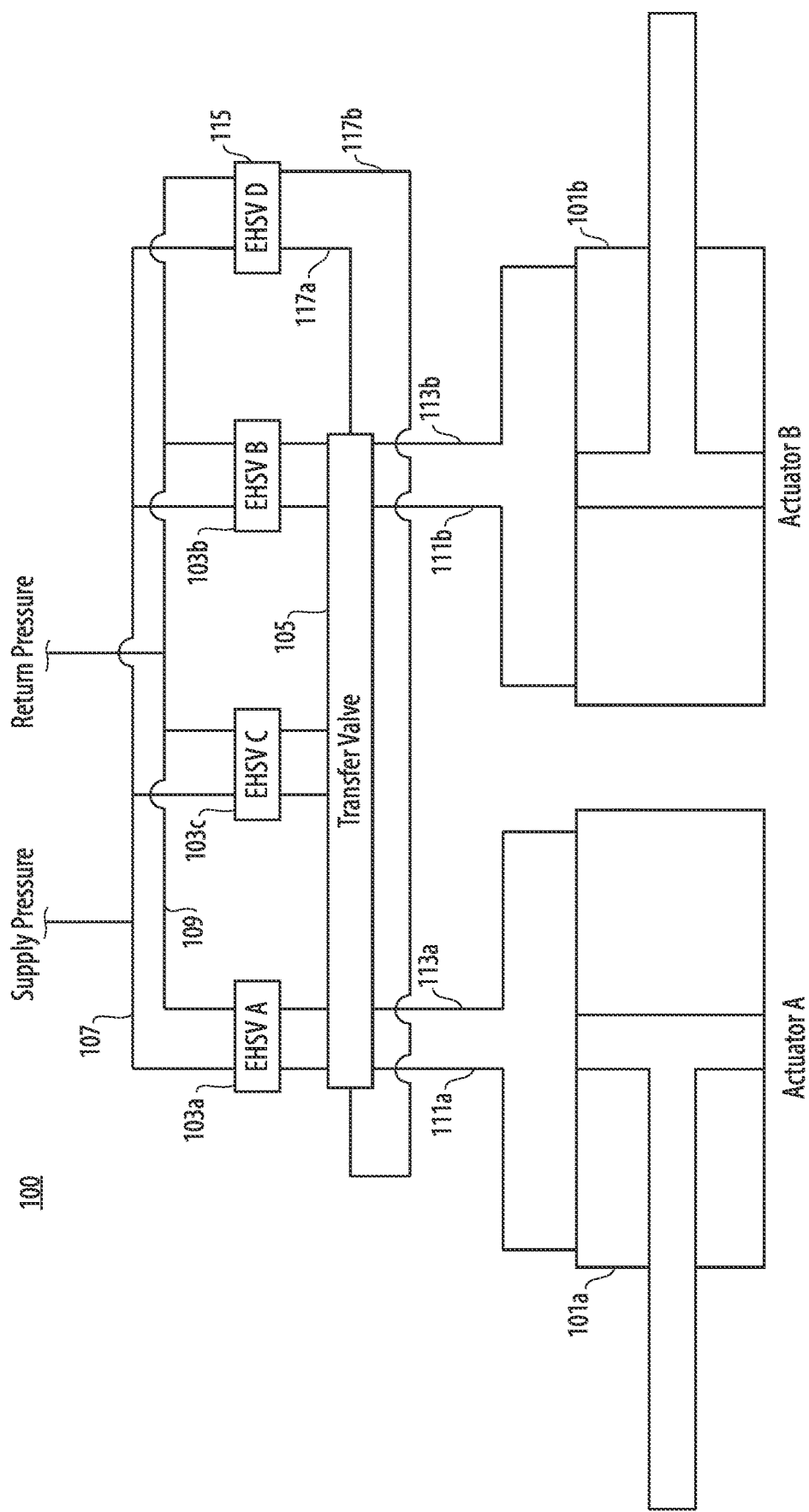
FIG. 1 is a schematic diagram of an embodiment of an actuator system in accordance with this disclosure.
Figure 2:
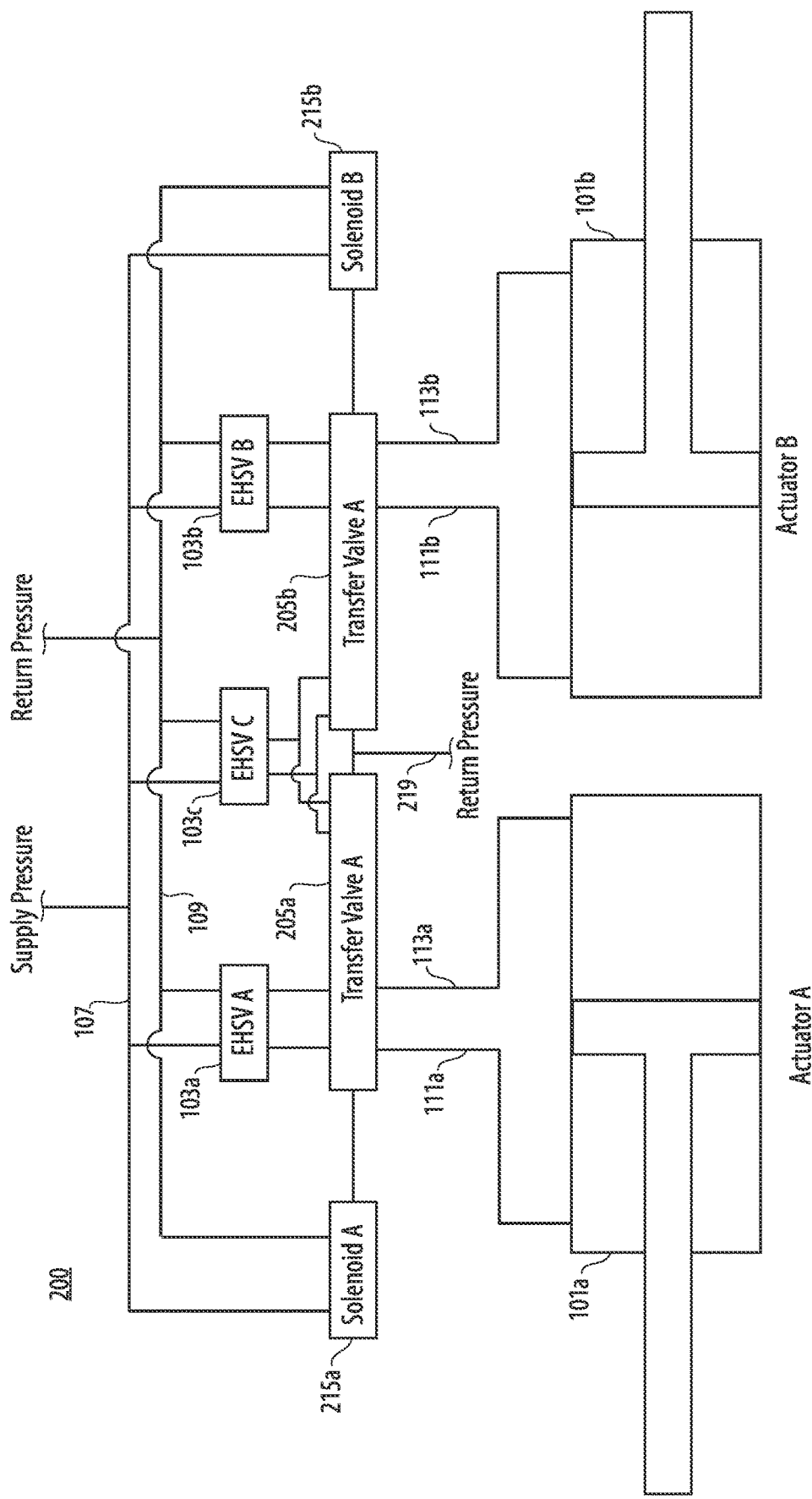
FIG. 2 is a schematic diagram of another embodiment of an actuator system in accordance with this disclosure.

Reference will now be made to the drawings wherein like reference numerals identify similar structural features or aspects of the subject disclosure. For purposes of explanation and illustration, and not limitation, an illustrative view of an embodiment of an actuator system in accordance with the disclosure is shown in FIG. 1 and is designated generally by reference character 100. Other embodiments and/or aspects of this disclosure are shown in FIG. 2. Certain embodiments described herein can be used to provide lighter and less complex actuator systems with redundant control, e.g., for aircraft.

Referring to FIGS. 1 and 2, an actuator system 100, 200 can include a first actuator 101a, a second actuator 101b, a first actuator control device 103a configured to control the first actuator 101a, and a second actuator control device 103b configured to control the second actuator 101b. The system 100, 200 can include a shared redundant actuator control device 103c and at least one transfer device 105, 205a, 205b operatively connected to the first, second, and shared redundant actuator control devices 103a, 103b, 103c.

The at least one transfer device 105, 205a, 205b can be configured to be operated to select between a first control mode where the first actuator control device 103a is operatively connected to the first actuator 101a to control the first actuator 101a and the second actuator control device 103b is operatively connected to the second actuator 101b to control the second actuator 101b, a second control mode where the shared redundant actuator control device 103c is operatively connected to the first actuator 101a to control the first actuator 101 and the second actuator control device 103b is operatively connected to the second actuator 101b to control the second actuator 101b, and a third control mode where the first actuator control device 103a is operatively connected to the first actuator 101a to control the first actuator 101a and the shared redundant actuator control device 103c is operatively connected to the second actuator 101b to control the second actuator 101b.

As shown, in certain embodiments, the first actuator 101a and the second actuator 101b can be hydraulic actuators. The first actuator control device 103a, the second actuator control device 103b, and the shared redundant actuator control device 103c can be electrohydraulic servo valves (EHSVs) configured to control a position of the first actuator 101a and/or second actuator 101b as a function of a respective actuator valve control pressures and electrical inputs when connected to a respective actuator 101a, 101b.

In certain embodiments, each actuator control device 103a, b, c is operatively connected to a supply pressure line 107 having a supply pressure and a return pressure line 109 having a return pressure. Each actuator control device 103a, b, c can be configured to output a first control pressure on a first control line 111a, 111b and a second control pressure on a second control line 113a, 113b to a respective actuator 101a, 101b when connected to the respective actuator 101a, 101b.

In certain embodiments, as shown in FIG. 1, the at least one transfer valve 105 can be a single transfer valve 105. The system 100 can include a transfer valve control device 115 configured to control the position of the single transfer valve 105. For example, the transfer valve 115 can be a spool valve that includes a spool configured to slide to selectively communicate different ports of the transfer valve 115. As shown, the transfer valve control device 115 can be an EHSV configured to control a position of the transfer valve 105 as a function of a first transfer valve control pressure on a first transfer control line 117a (e.g., connected to a first side of the transfer valve 105) and a second transfer valve control pressure on a second transfer control line 117b (e.g., connected to a second side of the transfer valve 105).

In certain embodiments, referring to FIG. 2, the at least one transfer valve 205a, 205b can include a first transfer valve 205a configured to select between the first actuator control device 103a and the shared redundant actuator control device 103c to be connected to the first actuator 101a, and a second transfer valve 205b configured to select between the second actuator control device 103b and the shared redundant actuator control device 103c to be connected to the second actuator 101b. The system 200 can include a first transfer valve control device 215a configured to control the position of the first transfer valve 205a, and a second transfer valve control device 215b configured to control the position of the second transfer valve 205b.

As shown in FIG. 2, the first transfer valve control device 215a can include a first solenoid valve connected to the first transfer valve 205a to supply a first transfer control pressure to the first transfer valve 205a on a first side thereof. As shown, the second transfer valve control device 215b can include a second solenoid valve connected to the second transfer valve 205b to supply a second transfer control pressure to the second transfer valve 205b on a first side thereof. In certain embodiments, the first transfer valve 205a and the second transfer valve 205b can be connected to a common return pressure line 219 on a respective second side thereof. As shown in FIG. 2, each control line of the shared redundant actuator control device 103c can be connected to the first transfer valve 205a and the second transfer valve 205b in parallel. In certain embodiments, the first transfer valve 205a and the second transfer valve 205b can be controlled to allow simultaneous control of both actuators 101a, 101b by the shared redundant actuator control device 103c.

In certain embodiments, each transfer valve can include a biasing member (e.g., a spring) to bias the transfer valve to a selected position such that motion in both directions is possible with a control single port from the solenoid. In certain embodiments, the solenoids can be switched out for EHSVs, for example. Any other suitable control devices are contemplated herein.

Certain embodiments can include a control module configured to control the control devices 103a, 103b, 103c, 115, 215a, 215b. The control module can include any suitable hardware and/or software module(s) configured to perform any suitable function (e.g., to control the transfer valve(s) to provide the herein disclosed modes and/or states to move the actuators as desired, e.g., as described below).

In accordance with at least one aspect of this disclosure, an aircraft actuator system can include two actuators, three control valves configured to provide primary control and redundant control for the two actuators. The aircraft actuator system can be any suitable actuator system disclosed herein, e.g., system 100, 200 as described above.

In accordance with at least one aspect of this disclosure, a method can include using a single shared redundant actuator control device to provide backup redundant control to two actuators on an aircraft. The method can include switching which actuator is connected to the single shared redundant actuator control device. The method can include any other suitable method(s) and/or portion(s) thereof.

Certain embodiments can reduce a control systems to three EHSVs and two solenoids for two actuators, saving weight. Certain embodiments can utilize four EHSV and no solenoids with a single transfer valve that can switch which system utilizes the third shared EHSV, reducing weight even more. Embodiments can have a shared backup valve, can save weight, and reduce I/O on the associated control system. Embodiments can provide better thermal efficiency due to less leakage from less connections in the fluid system.

Embodiments can provide dual independent actuators with shared redundancy. Such architectures can help to reduce the total weight, volume, and cost of such systems by reducing the number of required control components. Traditional designs can have two completely independent actuators each with two EHSVs, a two-position transfer valve and a solenoid. Embodiments, however, can utilize a four EHSVs and a three-position transfer valve. For example, the first actuator 101a and the second actuator 101b can each have one dedicated EHSV (e.g., device 103a, 103b, respectively) and they can share a third EHSV (e.g., device 103c). The position of the transfer valve can dictate which EHSVs arein control of each actuator, the transfer valve position can be controlled by a fourth EHSV (e.g., device 115). In a first position, each of the actuators can be linked to their dedicated EHSVs. When the first EHSV fails (e.g., device 103a), the fourth EHSV (e.g., device 115) can moves the transfer into a second position linking the shared EHSV (e.g., device 103c) to the first actuator 101a, while the second actuator 101b remains linked to the second EHSV (e.g., device 103b). When the second EHSV fails, the fourth EHSV can move the transfer valve into a third position linking the shared EHSV to the second actuator, while the first actuator remains linked to the first EHSV.

Certain embodiments can provide dual independent actuators with a shared backup EHSV. For example, a solenoid can select a high or low pressure to port to a respective transfer valve. This type of architecture can utilize three EHSVs, two transfer valves, and two solenoids. Operation of the transfer valves can be similar to that described above, except instead of using a fourth EHSV, each transfer valve can be controlled by a respective solenoid.

Embodiments can provide reduced weight/envelope (reduced control component count), reduced internal leakage (removal of one transfer valve and two solenoids compared to traditional architectures), increased reliability, and reduced I/O count. Any other suitable uses and/or benefits of embodiments of this disclosure are contemplated herein.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An actuator system, comprising:
   a first actuator;
   a second actuator;
   a first actuator control device configured to control the first actuator;
   a second actuator control device configured to control the second actuator;
   a shared redundant actuator control device; and
   at least one transfer device operatively connected to the first, second, and shared redundant actuator control devices and configured to be operated to select between:
     a first control mode wherein the first actuator control device is operatively connected to the first actuator to control the first actuator and the second actuator control device is operatively connected to the second actuator to control the second actuator;
     a second control mode wherein the shared redundant actuator control device is operatively connected to the first actuator to control the first actuator and the second actuator control device is operatively connected to the second actuator to control the second actuator; and
     a third control mode wherein the first actuator control device is operatively connected to the first actuator to control the first actuator and the shared redundant actuator control device is operatively connected to the second actuator to control the second actuator,
   wherein the first actuator and the second actuator are hydraulic actuators, wherein the first actuator control device, the second actuator control device and the shared redundant actuator control device are electro-hydraulic servo valves (EHSVs) configured to control a position of the first actuator and/or second actuator as a function of a respective actuator valve control pressures and electrical inputs when connected to a respective actuator.

2. The system of claim 1, wherein each actuator control device is operatively connected to a supply pressure line having a supply pressure and a return pressure line having a return pressure.

3. The system of claim 2, wherein each actuator control device is configured to output a first control pressure on a first control line and a second control pressure on a second control line to a respective actuator when connected to the respective actuator.

4. The system of claim 3, wherein the at least one transfer valve is a single transfer valve.

5. The system of claim 4, further comprising a transfer valve control device configured to control the position of the single transfer valve.

6. The system of claim 5, wherein the transfer valve control device is an EHSV configured to control a position of the transfer valve as a function of a first transfer valve control pressure on a first transfer control line and a second transfer valve control pressure on a second transfer control line.

7. The system of claim 2, wherein the at least one transfer valve includes a first transfer valve configured to select between the first actuator control device and the shared redundant actuator control device to be connected to the first actuator, and a second transfer valve configured to select between the second actuator control device and the shared redundant actuator control device to be connected to the second actuator.

8. The system of claim 7, further comprising a first transfer valve control device configured to control the position of the first transfer valve, and a second transfer valve control device configured to control the position of the second transfer valve.

9. The system of claim 8, wherein the first transfer valve control device includes a first solenoid valve connected to the first transfer valve to supply a first transfer control pressure to the first transfer valve on a first side thereof.

10. The system of claim 9, wherein the second transfer valve control device includes a second solenoid valve connected to the second transfer valve to supply a second transfer control pressure to the second transfer valve on a first side thereof.

11. The system of claim 10, wherein the first transfer valve and the second transfer valve are connected to a common return pressure line on a respective second side thereof.

12. An aircraft actuator system, comprising:
two actuators including a first actuator and a second actuator; and
three control valves configured to provide primary control and redundant control for the two actuators, the three control valves including, a first actuator control device configured to control the first actuator, a second actuator control device configured to control the second actuator, a shared redundant actuator control device; and
at least one transfer device operatively connected to the first, second, and shared redundant actuator control devices and configured to be operated to select between:
a first control mode wherein the first actuator control device is operatively connected to the first actuator to control the first actuator and the second actuator control device is operatively connected to the second actuator to control the second actuator;
a second control mode wherein the shared redundant actuator control device is operatively connected to the first actuator to control the first actuator and the second actuator control device is operatively connected to the second actuator to control the second actuator; and
a third control mode wherein the first actuator control device is operatively connected to the first actuator to control the first actuator and the shared redundant actuator control device is operatively connected to the second actuator to control the second actuator,
wherein the first actuator and the second actuator are hydraulic actuators, wherein the first actuator control device, the second actuator control device and the shared redundant actuator control device are electrohydraulic servo valves (EHSVs) configured to control a position of the first actuator and/or second actuator as a function of a respective actuator valve control pressures and electrical inputs when connected to a respective actuator.

13. The system of claim 12, wherein each actuator control device is operatively connected to a supply pressure line having a supply pressure and a return pressure line having a return pressure.

14. A method, comprising:
using a first actuator control device, a second actuator control device, and a shared redundant actuator control device to provide backup redundant control to a first actuator and a second actuator on an aircraft, the first actuator control device configured to control the first actuator, the second actuator control device configured to control the second actuator; and
wherein the first actuator control device, the second actuator control device and the shared redundant actuator control device are electrohydraulic servo valves (EHSVs) configured to control a position of the first actuator and/or second actuator as a function of a respective actuator valve control pressures and electrical inputs when connected to a respective actuator.

15. The method of claim 14, further comprising switching which actuator is connected to the single shared redundant actuator control device.

* * * * *